US012578031B2

(12) United States Patent
Williams et al.

(10) Patent No.: US 12,578,031 B2
(45) Date of Patent: Mar. 17, 2026

(54) ADAPTOR ASSEMBLY

(71) Applicant: CRANE PROCESS FLOW TECHNOLOGIES LTD, Gwent (GB)

(72) Inventors: Paul Williams, Cwmbran (GB); Adam Walton, Cwmbran (GB); Sushant Nair, Cwmbran (GB); Nikhil Jagatap, Cwmbran (GB)

(73) Assignee: CRANE PROCESS FLOW TECHNOLOGIES, Cwmbran (GB)

( * ) Notice: Subject to any disclaimer, the term of this patent is extended or adjusted under 35 U.S.C. 154(b) by 270 days.

(21) Appl. No.: 18/029,760

(22) PCT Filed: Oct. 1, 2021

(86) PCT No.: PCT/GB2021/052539
§ 371 (c)(1),
(2) Date: Mar. 31, 2023

(87) PCT Pub. No.: WO2022/069898
PCT Pub. Date: Apr. 7, 2022

(65) Prior Publication Data
US 2023/0366480 A1 Nov. 16, 2023

(30) Foreign Application Priority Data
Oct. 2, 2020 (GB) ..................................... 2015655

(51) Int. Cl.
*F16K 27/06* (2006.01)
*F16K 5/06* (2006.01)
*F16K 31/05* (2006.01)

(52) U.S. Cl.
CPC .......... *F16K 27/067* (2013.01); *F16K 5/0631* (2013.01); *F16K 31/055* (2013.01)

(58) Field of Classification Search
CPC .... F16K 27/067; F16K 5/0631; F16K 31/055; F16K 5/0626
(Continued)

(56) References Cited

U.S. PATENT DOCUMENTS

| | | | | |
|---|---|---|---|---|
| 3,194,259 A | * | 7/1965 | Garrod | F16K 3/316 |
| | | | | 137/454.2 |
| 3,386,699 A | * | 6/1968 | Petter | F16K 5/0626 |
| | | | | 277/369 |

(Continued)

FOREIGN PATENT DOCUMENTS

| | | |
|---|---|---|
| CN | 107461510 A | 12/2017 |
| CN | 109973678 A | 7/2019 |
| EP | 0 085 280 A1 | 8/1983 |

OTHER PUBLICATIONS

International Search Report, issued in PCT/GB2021/052539, dated Jan. 21, 2022.

(Continued)

*Primary Examiner* — John Bastianelli
(74) *Attorney, Agent, or Firm* — Rockman, Videbeck & O'Connor, LLC; Mercedes V. O'Connor

(57) ABSTRACT

A ball valve adaptor assembly for connection to a ball valve cartridge and for connection to a valve actuator, wherein the adaptor comprises: an outlet connector, the outlet connector comprising an outlet connector plate and an outlet pipe, the outlet connector plate configured to connect to a housing outlet of the ball valve cartridge with the outlet pipe extending away from the housing outlet, and an inlet connector, the inlet connector comprising an inlet connector plate and an inlet pipe, the inlet connector plate configured to connect to a housing inlet of the ball valve cartridge with the inlet pipe extending away from the housing inlet, an actuator connector configured to reversibly connect to the outlet and inlet connector plates and configured to reversibly connect to the
(Continued)

valve actuator, and wherein in use, when the outlet plate, inlet plate and actuator connector are connected, a cartridge cavity is formed between the outlet plate, inlet plate and the actuator connector, and wherein the cartridge cavity is configured to reversibly receive the ball valve cartridge.

28 Claims, 9 Drawing Sheets

(58) Field of Classification Search
USPC ...... 251/315.01–315.16, 286–288, 292–293, 251/148, 152; 137/269–271, 137/315.17–315.32
See application file for complete search history.

(56) References Cited

U.S. PATENT DOCUMENTS

| | | | | |
|---|---|---|---|---|
| 3,401,913 A | * | 9/1968 | Scaramucci | F16K 27/067 |
| | | | | 251/151 |
| 3,472,270 A | * | 10/1969 | Masheder | F16K 5/0636 |
| | | | | 251/315.08 |
| 3,556,473 A | | 1/1971 | Scaramucci | |
| 3,561,730 A | * | 2/1971 | Hurst | F16K 5/0631 |
| | | | | 251/315.13 |
| 3,675,893 A | * | 7/1972 | Avelines | F16K 5/0626 |
| | | | | 251/316 |
| 3,981,482 A | * | 9/1976 | Callahan, Jr. | F16K 5/0631 |
| | | | | 137/454.2 |
| 4,270,849 A | * | 6/1981 | Kalbfleisch | F16K 17/386 |
| | | | | 137/75 |
| 4,562,860 A | * | 1/1986 | Walter | F16K 5/0636 |
| | | | | 251/315.08 |
| 5,482,251 A | * | 1/1996 | Roberts | F16K 35/06 |
| | | | | 251/293 |
| 5,954,088 A | | 9/1999 | Huang | |
| 6,135,417 A | * | 10/2000 | Wadsworth | F16K 31/602 |
| | | | | 251/291 |
| 6,848,672 B2 | * | 2/2005 | Cross | F16K 31/055 |
| | | | | 285/921 |
| 2007/0176068 A1 | * | 8/2007 | Kuo-Chen | F16K 27/067 |
| | | | | 248/300 |
| 2014/0299198 A1 | | 10/2014 | Diehl et al. | |

OTHER PUBLICATIONS

United Kingdom Search Report, issued in Priority Application No. 2015655.0, dated Feb. 2, 2021.
Written Opinion of the International Searching Authority, issued in PCT/GB2021/052539, dated Jan. 21, 2022.

* cited by examiner

630

600

222

303

302

700

ADAPTOR ASSEMBLY

FIELD OF THE INVENTION

This invention relates to an adaptor assembly. In particular, though not exclusively, the invention relates to an adaptor assembly for connection to a ball valve cartridge and for connection to a valve actuator; as well as to kits and uses of the same.

BACKGROUND OF THE INVENTION

Ball valve assemblies are well known in the art (e.g. ASME BPE-2019 and https://en.wikipedia.org/wiki/Ball_valve) and are typically used to control a fluid flow through a fluid system.

A ball valve assembly in essence uses a rotary ball (i.e. sphere/spherical part) to block the fluid flow through a pipe system. The rotary ball also has a bore through it, which can allow fluid to pass through the rotary ball. The valve is in an open (or partly open) position when the bore is in alignment (or partial alignment) with the path of the fluid flow. The valve is in a closed position when the bore is not in alignment (e.g. orthogonal) with the path of the fluid flow. Therefore, the position of the rotary ball (e.g. moved by rotation of the ball) can be used to control the fluid flow through the valve and hence the wider pipe system. To rotate the rotary ball of the ball valve assembly, the rotary ball is connected to a rotatable stem, the stem fitting within a slot in the rotary ball (e.g. see FIG. 1). When the stem is rotated the rotary ball is also rotated. A lever arm is often attached to the stem to aid turning of the stem.

To prevent fluid leaks and other problems developing, the valves need to be periodically opened and inspected, and any parts such as seats, seals and the rotary ball element replaced. Aside from the cost in labour and materials, this routine maintenance can result in lost productivity where the wider pipe system must be shut down. Minimising any shut down time is therefore important.

There remains a need in the art for improved ball valve assemblies.

SUMMARY OF THE INVENTION

In a first aspect of the invention, there is provided a ball valve adaptor assembly for connection to a ball valve cartridge and for connection to a valve actuator, wherein the adaptor comprises:

an outlet connector, the outlet connector comprising an outlet connector plate and an outlet pipe, the outlet connector plate configured to connect to a housing outlet of the ball valve cartridge with the outlet pipe extending away from the housing outlet, and an inlet connector, the inlet connector comprising an inlet connector plate and an inlet pipe, the inlet connector plate configured to connect to a housing inlet of the ball valve cartridge with the inlet pipe extending away from the housing inlet, an actuator connector configured to reversibly connect to the outlet and inlet connector plates and configured to reversibly connect to the valve actuator, and wherein in use, when the outlet plate, inlet plate and actuator connector are connected, a cartridge cavity is formed between the outlet plate, inlet plate and the actuator connector, and wherein the cartridge cavity is configured to reversibly receive the ball valve cartridge.

The ball valve adaptor assembly of the invention provides the advantage that it can reversibly connect and hold a ball valve cartridge to a valve actuator. This means that the ball valve cartridge can be released from a pipe system very simply and so the seal/seats and rotary ball can be inspected and maintained; or the cartridge simply swapped with a fresh cartridge. The used cartridge can be inspected and maintained and recycled at a later time. At the same time the valve actuator and wider pipe system is not disturbed (e.g. the pipes extending away from the ball valve adaptor assembly might be welded in place). This solution means that maintenance is simplified and any loss in productivity by shutting down the wider fluid/pipe system is minimised.

In an embodiment, the actuator connector comprises an actuator connector plate, the actuator connector plate comprises attaching means to reversibly mate with cooperating attaching means on the valve actuator.

In an embodiment, the attachment to the valve actuator is symmetrical and hence bi-directional. In an embodiment, the outlet connector plate and inlet connector plate are configured to be spaced apart and to face each other when the actuator connector connects to the outlet and inlet connector plates. In an embodiment, the outlet connector plate and inlet connector plate are configured to be spaced apart and to face each other when the actuator connector plate connects to the outlet and inlet connector plates.

In an embodiment, the actuator connector plate connects to the outlet and inlet connector plates via dovetail joints, the dovetail joints permit the outlet connector plate and inlet connector plate to move away from the actuator connector plate in a direction substantially in the plane of the actuator connector plate. This arrangement means that the movement of the plates is restricted and the plate cannot move up/down with respect to the actuator connector plate. Also, the arrangement of these joints helps to align the system pipes attached to the outlet/inlet pipe of the ball valve adaptor assembly. It is best if these system pipes are aligned, and not offset, where this might otherwise create strain in the wider fluid/pipe system.

In an embodiment, the dovetail joints do not permit the outlet connector plate and the inlet connector plate to move in a direction orthogonal to the plane of the actuator connector plate.

In an embodiment, the outlet connector plate and the inlet connector plate each comprise aligning (securing) holes to receive reversibly removable connecting means, which when connected align and secure the plates together In an embodiment, the aligning holes and reversibly removable connecting means comprise cooperating threads. In an embodiment the reversibly removable connecting means are bolts or screws.

In an embodiment, the aligning holes comprise cooperating threads to cooperate with threads on the reversibly removable connecting means.

In an embodiment, the actuator connector comprises intermediate aligning conduits that are configured in use to align with the aligning holes, and which are configured in use to also receive the reversibly removable connecting means.

In an embodiment, the actuator connector comprises an actuator base plate, the actuator base plate comprises legs, the legs comprising the intermediate aligning conduits.

In an embodiment, the actuator connector comprises intermediate aligning conduits that are in use to align with the aligning holes, and which are configured in use to also receive the reversibly removable connecting means. In an embodiment, the actuator connector plate comprises intermediate aligning conduits that are in use to align with the aligning holes, and which are configured in use to also receive the reversibly removable connecting means.

In an embodiment, the actuator connector comprises legs, the legs comprising intermediate aligning conduits that are in use aligned with the aligning holes, and which are configured in use to also receive the reversibly removable connecting means.

In an embodiment, the actuator connector plate comprises legs, the legs comprising intermediate aligning conduits that are in use aligned with the aligning holes, and which are configured in use to also receive the reversibly removable connecting means.

In an embodiment, the first aspect (and embodiments thereof), further comprise the ball valve cartridge, the ball valve cartridge comprising:

a valve stem element comprising
        a reversibly rotatable stem part; and
    a valve housing comprising
        the housing inlet and the housing outlet in fluid communication via a fluid path therebetween, and
        wherein the fluid path comprises a ball chamber;
    a rotary ball element comprising:
        a ball inlet and a ball outlet in fluid communication via a fluid conduit therebetween,
        a means to receive rotational force from the stem part,
        wherein the ball chamber is configured to house the rotary ball element; and
    wherein the ball valve cartridge reversibly fits into the cartridge cavity; and
    wherein in use, when the stem part is rotated, providing rotational force to the means to receive rotational force, the rotary ball element is rotated within the ball chamber, and
    wherein the valve is in an open position when the fluid conduit is in fluid communication with the housing inlet and the housing outlet, and the valve is in a closed position when the fluid conduit is not in fluid communication with the housing inlet and the housing outlet.

In an embodiment, the actuator connector comprises a stem port configured to allow the stem part of the ball valve cartridge to pass through the actuator connector.

In an embodiment, the stem port passes through the actuator base plate and the actuator connector plate, and wherein the actuator base plate and the actuator connector plate are connected via an intervening stem portion.

In an embodiment, the ball valve cartridge comprises intermediate aligning holes that are configured to align with the aligning holes, and which are configured to also receive the reversibly removable connecting means.

In an embodiment, the intermediate aligning holes pass through the bottom and/or top portion of the ball valve cartridge.

In an embodiment, the intermediate aligning holes pass through the bottom portion of the ball valve cartridge.

In an embodiment, the intermediate aligning holes are configured to also receive the reversibly removable connecting means.

In an embodiment, the intermediate aligning holes comprise cooperating threads to cooperate with threads on the reversibly removable connecting means.

In an embodiment, the intermediate aligning holes do not comprise cooperating threads to cooperate with threads on the reversibly removable connecting means.

In an embodiment, the intermediate aligning holes are one or more of a (smooth) bore, open channel, notch, or cut-away section in the ball valve cartridge.

In an embodiment, the means to receive rotational force is a stem recess in the rotary ball element, the stem recess configured to receive the stem part, and wherein the valve housing comprises a stem port, the stem port configured to allow the stem part to pass through the valve housing.

In an embodiment, the stem recess is a slot.

In an embodiment, the means to receive rotational force is a first region in the rotary ball element comprising a magnet, the first region configured to magnetically connect with a second region comprising a magnet in the stem element, and wherein in use, when the stem part is rotated, and the first and second regions are magnetically connected, the rotary ball element is rotated within the ball chamber.

In an embodiment, the first and second regions are not in direct physical contact.

In an embodiment, the actuator connector comprises attaching means to reversibly mate with cooperating attaching means on the valve actuator. In an embodiment, the actuator connector plate comprises attaching means to reversibly mate with cooperating attaching means on the valve actuator.

In an embodiment, the attaching means comprises a projection which mates with a cooperating recess in the cooperating attaching means, or the attaching means comprises the cooperating recess which mates with the projection on the cooperating attaching means.

In an embodiment, the projection comprises an asymmetric head portion which locks into the cooperating recess when the head is rotated after it has mated with the cooperating recess.

In an embodiment, the attaching means comprises a plate hole and the cooperating attaching means comprises a cooperating hole, wherein the plate hole and cooperating hole are configured to receive reversibly removable joining means, the reversibly removable joining means in use reversibly secures the actuator connector plate and valve actuator together.

In an embodiment, the plate hole and cooperating hole comprise cooperating threads to cooperate in use with threads on the reversibly removable joining means.

In an embodiment, the reversibly removable joining means is a bolt and/or grub screw.

In an embodiment, the first aspect (or embodiments thereof), further comprise the valve actuator.

In an embodiment, the valve actuator is a turn actuator.

In an embodiment, the valve actuator comprises means to receive the stem element and wherein the actuator is configured to rotate the stem part when the actuator is rotated.

In an embodiment, the valve actuator comprises a means to allow restricted rotation of the stem part.

In an embodiment, the means to allow restricted rotation allows rotation of up to 90 degrees, optionally up to 45 degrees, and further optionally up to 15 degrees Herein disclosed is a ball valve cartridge for use with the aspects or embodiments of the invention.

Herein disclosed is the use of the ball valve adaptor assembly according to any one of the aspects or embodiments herein disclosed. Herein disclosed is a ball valve adaptor assembly kit, the kit comprising any one of the aspects or embodiments herein disclosed in the form of a kit of parts. Herein disclosed is a system comprising a ball valve adaptor assembly according to any one of the aspects or embodiments herein disclosed. Herein disclosed is a ball valve adaptor assembly substantially as herein described with reference to or as illustrated in the accompanying drawings.

The present invention will now be further described with reference to the following non-limiting examples and the accompanying illustrative drawings, of which:

BRIEF DESCRIPTION OF THE DRAWINGS

Like parts have been given the same reference numerals.

DETAILED DESCRIPTION OF THE INVENTION

Figure 1:
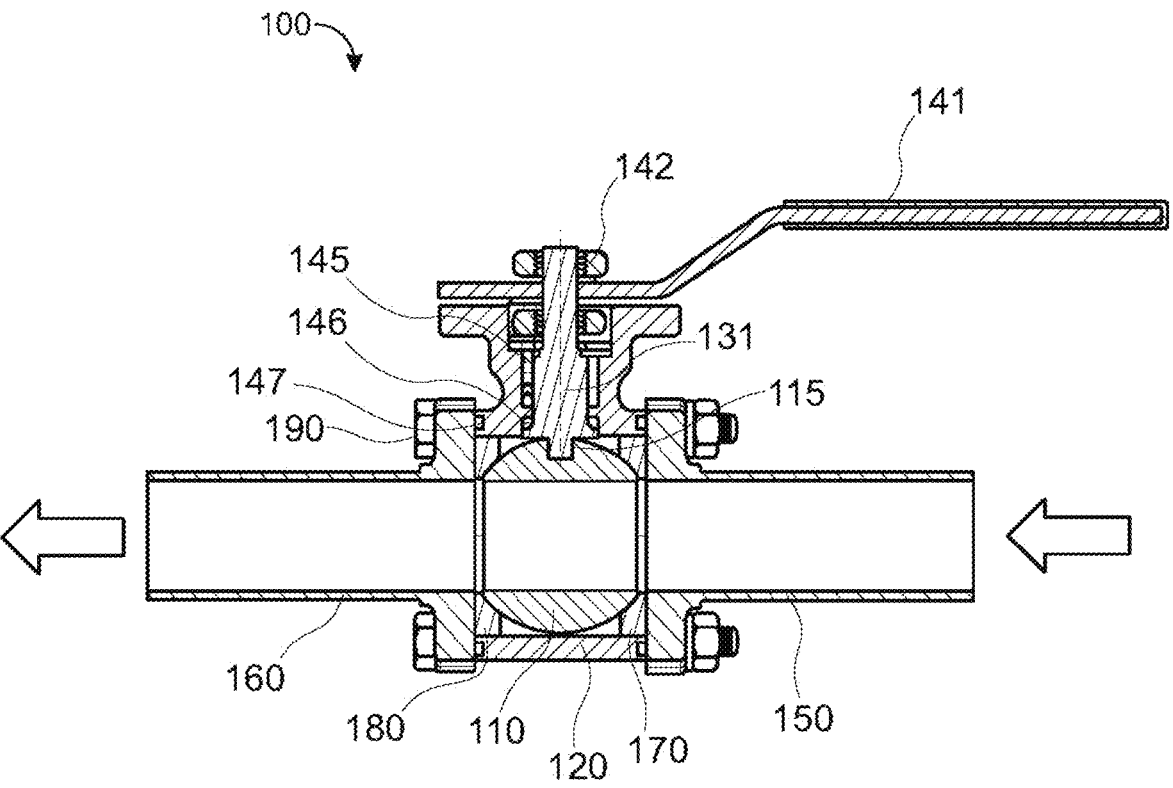
FIG. 1 is a cross-section view of a system (100) comprising a ball valve assembly of the prior art.

FIG. 1 shows a cross-sectional view of a system (100) comprising a ball valve assembly of the prior art. A rotary ball (110) having a bore through it is located between valve seats (170, 180). Inlet/outlet connectors (150, 160) are located either side of the valve seats (170, 180). The inlet/outlet connectors (150, 160) each have a pipe extending in a direction away from the rotary ball (110). The inlet/outlet connectors (150, 160), valve seats (170, 180) and the housing (120) (housing the rotary ball (110)) are compressively held together by bolts (190), the bolts passing through holes.

The lower end of the stem part (131) fits into a slot (115) in the rotary ball (110). The upper end of the stem part is threaded to connect to a lever arm (141) held in place by a securing nut (142). Packing materials/seals (145, 146, 147) are positioned around the stem part (131) to prevent fluid leaking out of the system from the fluid path via the intermediate surfaces. These packing materials/seals (145, 146, 147) need to be routinely inspected and maintained to prevent fluid leaks.

In use, when the lever arm (141) is rotated, the stem part (131) is caused to rotate. The stem part fits within the slot (115) in the rotary ball (110), so rotation of the stem part (131) in turn causes the rotary ball (110) to also rotate in the same direction. The valve is in an open position when the bore of the rotary ball (110) is in alignment with the bore of the pipes of the inlet/outlet connectors (150, 160). The valve is in a closed position when the bore of the rotary ball (110) is not in alignment with the bore of the pipes of the inlet/outlet connectors (150, 160). The bore may of course be moved to a partially open position, where the bore of the rotary ball (110) is not fully aligned with the bore of the inlet/outlet connectors (150, 160). This arrangement restricts the fluid flow through the valve and hence any connected fluid/pipe system. This gives control of the fluid flow through the valve and any connected fluid/pipe system.

The black arrows indicate an illustrative direction of fluid flowing through the system (100). However, the direction is reversible.

FIG. 2(a) shows a perspective view of a ball valve adaptor assembly embodiment (200) ready to receive a ball valve cartridge embodiment (300) in the cartridge cavity (241) formed between outlet connector (210; e.g. 211-214) inlet connector (220; e.g. 221-225) and actuator connector (230; e.g. 231-235).

The outlet connector (210), inlet connector (220) and actuator connector (230) each respectively comprise an outlet connector plate (211), an inlet connector plate (221) and an actuator connector plate (231). The outlet connector plate (211), and inlet connector plate (221) are bridged by the actuator connector plate (231). The actuator connector plate (231) facilitates the formation of two dovetail joints (232), located on opposite edges of the plate. Dovetail joint holes (235) reversibly and slidably mate with dovetail projections (214 and 224) on the top edge of the outlet connector (211) and inlet connector (221) plates. The outlet connector plate (211) is equipped with an outlet pipe (212) which extends in a direction away from the actuator connector plate (231) and forms a bore through the outlet plate (211). The inlet connector plate (221) is equipped with an inlet pipe (222) which extends in a direction away from the actuator connector plate (231) and forms a bore through the inlet plate (221). The outlet pipe (212) and inlet pipe (222) allow the adaptor assembly embodiment (200) to connect to a wider fluid/pipe system (e.g. welding to system pipes). The actuator connector (230) also has an actuator connector plate stem port (233) through the actuator connector plate (231) to allow the cartridge stem part (303) to pass through.

The ball valve cartridge embodiment (300) comprises a rotary cartridge ball (302) within a cartridge valve housing (301).

The rotary cartridge ball (302) comprises a substantially spherical ball. The rotary cartridge ball (302) has a substantially circular cartridge ball inlet and a substantially circular cartridge ball outlet with a bore-like fluid conduit of substantially uniform cross-section, linking the cartridge ball inlet and cartridge ball outlet. The top region of the rotary cartridge ball (302) is equipped with a slot which mates with the lower region of cartridge stem part (303).

The cartridge valve housing (301) is equipped with a substantially circular cartridge housing inlet (304) and a substantially circular cartridge housing outlet with a fluid path of substantially uniform cross-section linking the cartridge housing inlet and cartridge housing outlet. Located in the fluid path is a cartridge ball chamber, which is slightly bigger than the rotary cartridge ball (302), and in use houses the rotary cartridge ball (302). The cartridge valve housing (301) has a cartridge stem hole that is shaped to allow the cartridge stem part (303) to pass through it, albeit with sealing means to make this a fluid tight junction. The cartridge stem part (303) is equipped with a threaded top section. A threaded nut, locking washer and cover ring hold the cartridge stem part (303) to the cartridge valve housing (301).

The valve cartridge embodiment (300) also comprises an inlet valve seat (306) and an outlet valve seat with annular inlet/outlet fluid sealing surfaces. In use, aligning holes (213, 223) and intermediate aligning holes (305) accept reversibly removable bolts (225) to compressively hold the valve cartridge embodiment (300) between the outlet connector plate (211) and inlet connector plate (221). In this arrangement, the inlet/outlet valve seats lie respectively between the inlet connector plate (221) and the outlet connector plate (211) forming a fluid tight seal.

Figure 2:
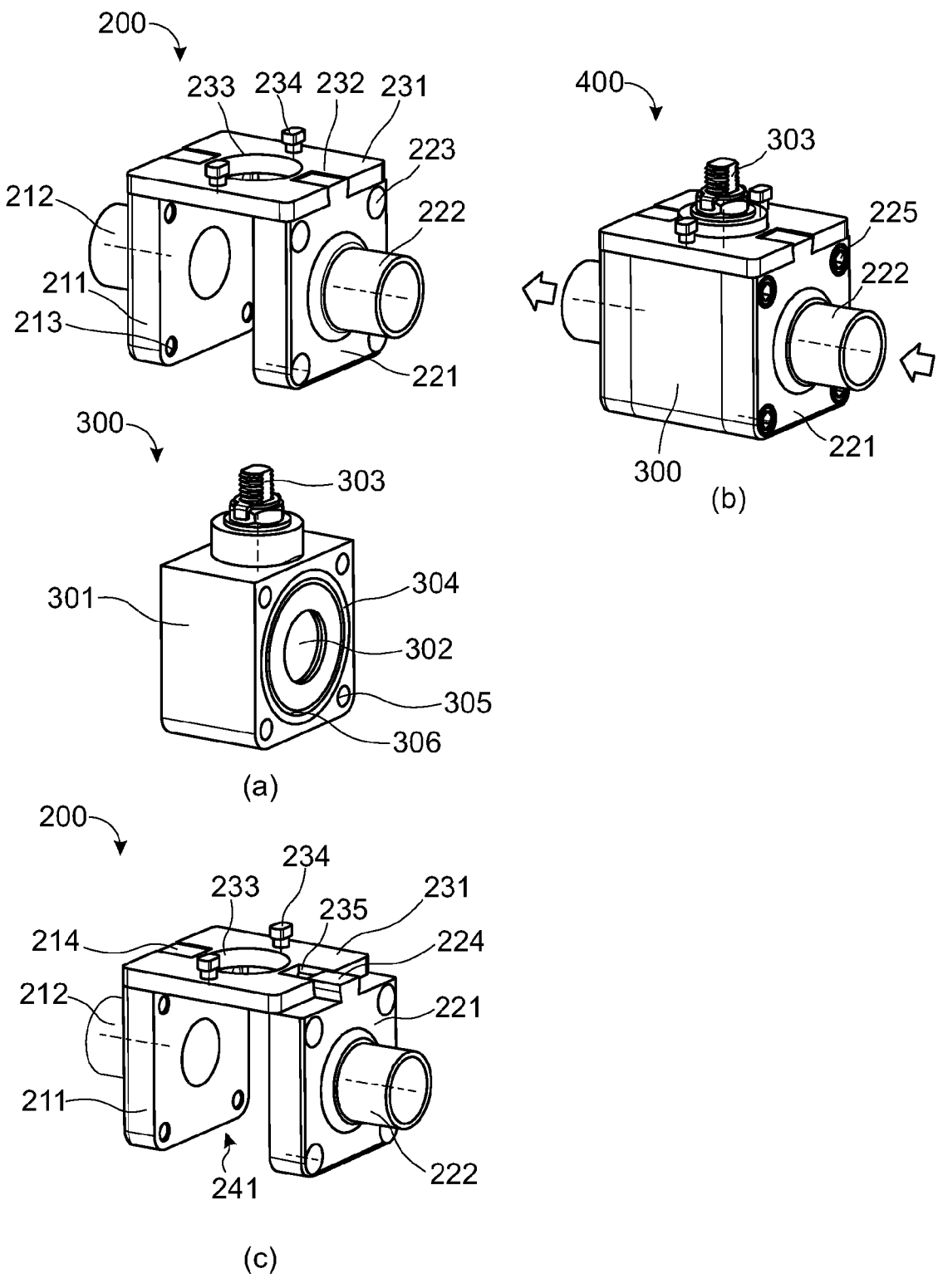
FIG. 2(a)-(c) show perspective views of a ball valve adaptor assembly embodiment; with FIGS. 2(a) and 2(b) also showing a ball valve cartridge embodiment.

FIG. 2(*b*) shows a perspective view of the cartridge embodiment (300) inserted and bolted into the adaptor assembly embodiment (200) to give an assembled module (400). In use, the rotary cartridge ball (302) is located in the ball chamber of the cartridge valve housing (301). The rotary cartridge ball (302) can rotate about a vertical axis, i.e. an axis normal to the fluid path.

In use, when the cartridge stem part (303) is rotated, this rotates the rotary cartridge ball (302) in the same direction. So, a rotation of the cartridge stem part (303) by 45 degrees will cause the rotary cartridge ball (302) to rotate 45 degrees in the same direction. The valve would therefore be in a partially open position, restricting the fluid flow through the valve and hence any connected fluid/pipe system. This gives control of the fluid flow through the valve and any connected fluid/pipe system.

The assembled module (400) is in an open position (allowing fluid to pass through the module) when the fluid conduit is in fluid communication with the cartridge housing inlet (304) and the cartridge housing outlet. The valve is in a closed position (not allowing fluid to pass through the module) when the fluid conduit is not in fluid communication with the housing inlet (304) and the housing outlet. The reversibly rotatable cartridge stem part (303) is arranged such that a 90 degree rotation will move the valve from a fully open position to a fully closed position.

In FIG. 2(*b*), the black arrows indicate an illustrative direction of fluid flowing through the module (400). However, the direction is reversible.

FIG. 2(*c*) shows a perspective view of the valve adaptor assembly embodiment (200), where the wedge-shaped dovetail joint protrusion (224) of the inlet connector plate (221) has been slid out from engagement with the associated cooperating dovetail joint hole (235) of the actuator connector pate (231).

Figure 3:
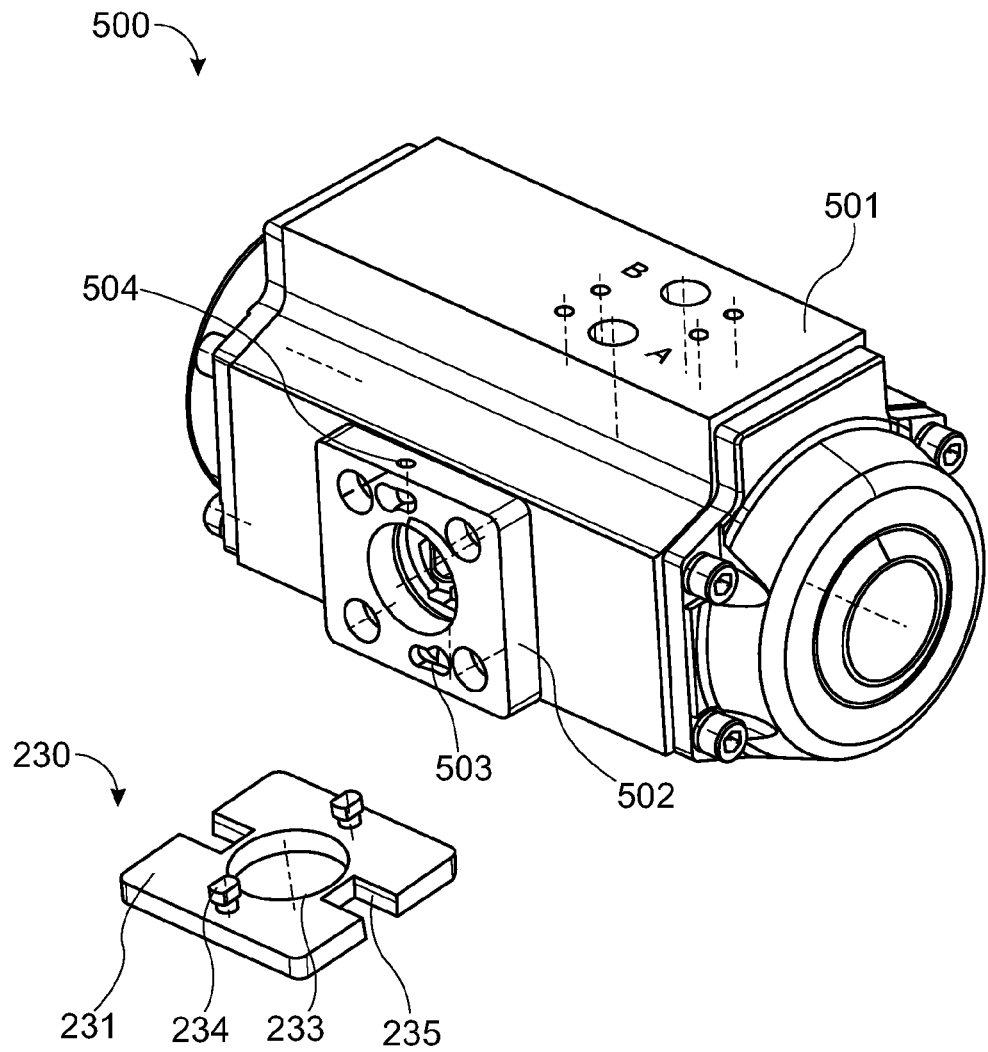
FIG. 3 shows a perspective view of a valve actuator embodiment next to an actuator connector embodiment of a valve adaptor assembly embodiment.

FIG. 3 shows a perspective view of a turn valve actuator embodiment (500) and an actuator connector embodiment (230). The turn valve actuator (500) has an actuator body (501) portion and a valve stem connector plate (502). The two cooperating recesses (503) on the stem connector plate (502) are arranged to reversibly mate with the asymmetric head portions of two cooperating attaching means (234) on the valve actuator connector plate (231). The cooperating recesses (curved cam slots) and cooperating attaching means (Tee bolts) reversibly mate when the head portion is inserted into the recess and the actuator body (501) is rotated with respect to the valve actuator connector plate (231). A locking screw fits in locking screw hole (504) to hold the arrangement in place. In use, the reversibly rotatable cartridge stem part (303) is rotated when the actuator body (501) portion is reversibly rotated/twisted by a user. The actuator body (501) may be reversibly rotated by a quarter turn, resulting in opening and closing of the valve.

Figure 4:
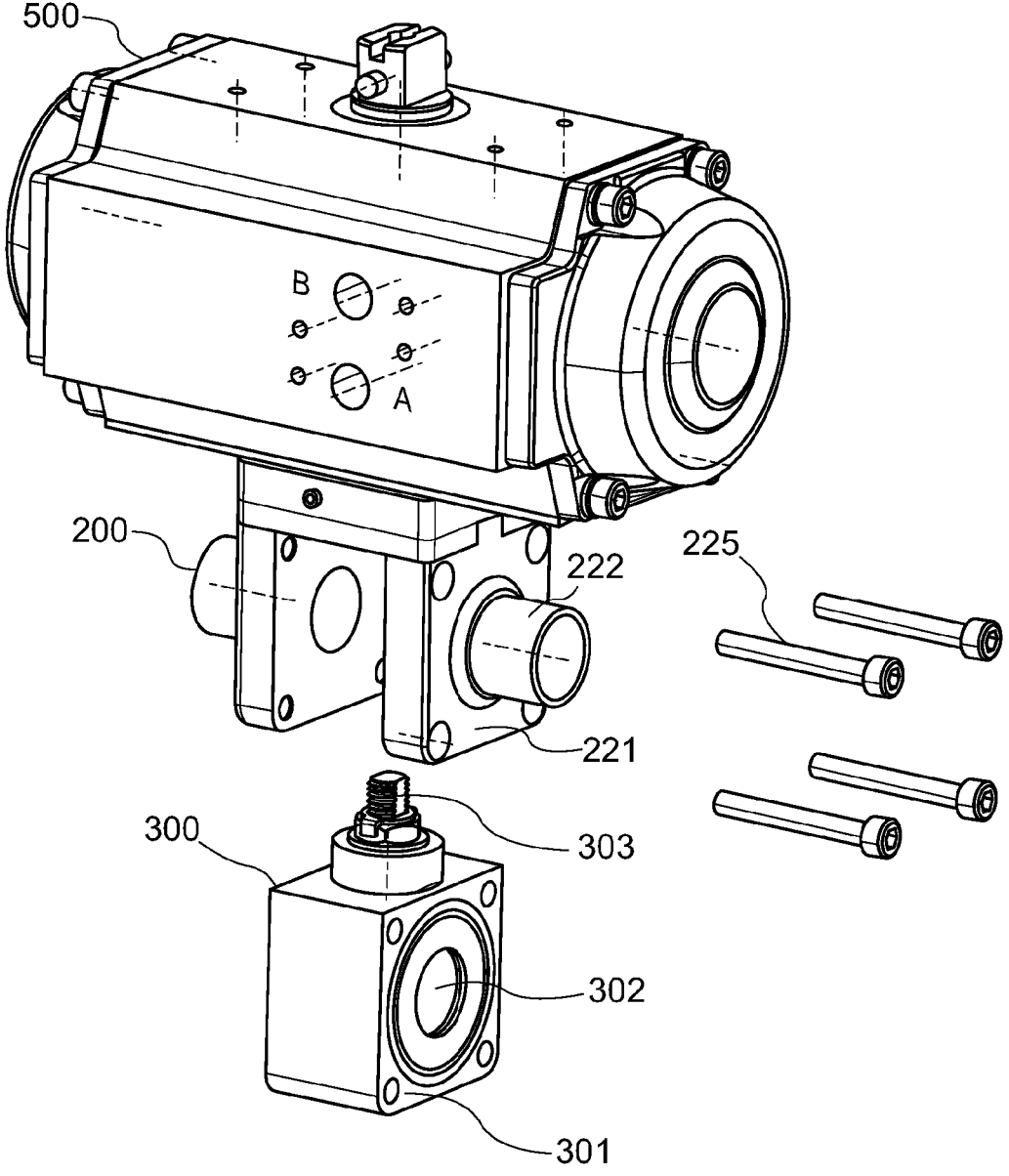
FIG. 4 shows a perspective view of a ball valve adaptor assembly embodiment, a valve actuator embodiment and a ball valve cartridge embodiment.

FIG. 4 shows a perspective view of a ball valve adaptor assembly embodiment (200) a valve actuator embodiment (500) and a ball valve cartridge embodiment (300). In FIG. 4, the ball valve adaptor assembly embodiment (200) and the valve actuator embodiment (500) are attached as outlined in FIG. 3. The ball valve cartridge embodiment (300) has been released in a downward direction from the joined system (200, 500) by removing the four reversibly removable bolts (225) from the aligning holes (213, 223) and from the intermediate aligning holes (305). In this way the ball valve cartridge embodiment (300), and the constituent parts there of (seat/seals and rotary cartridge ball etc.), can be inspected and maintained whilst the rest of the wider pipe system remains intact (e.g. where outlet/inlet pipe (212, 222) are welded to a wider fluid/pipe system). The ball valve cartridge embodiment (300), or a replacement, can be added back into the system by reversing the process. That is, the ball valve cartridge embodiment (300) is moved into cartridge cavity (241), the cartridge stem part (303) passing through the actuator connector plate stem port (233) to engage with the valve actuator embodiment (500). The reversibly removable bolts (225) pass through the aligning holes (213, 223) of the adaptor assembly embodiment (200) and through the intermediate aligning holes (305) of the ball valve cartridge embodiment (300). The bolts (225) are tightened to compressively holding the plates and cartridge together.

Figure 5:
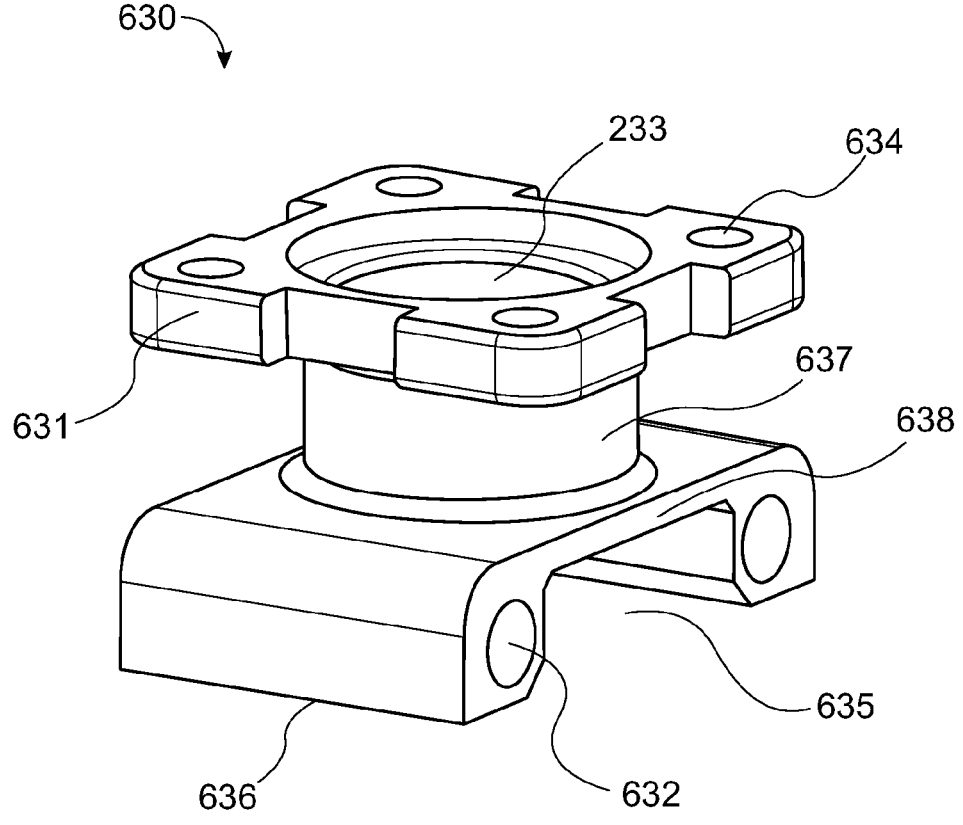
FIG. 5 shows a perspective view of an embodiment of the actuator connector (630).

FIG. 5 shows a perspective view of an embodiment of the actuator connector (630). The actuator connector (630) comprises actuator connector plate (631) connected to actuator base plate (638) via a hollow body section (637). The actuator base plate (638) comprises two legs (636), forming a saddle-like structure. The space (635) between the legs (636) is configured, in use, to allow a cartridge embodiment (700) to fit in snugly, with shoulder notches (707) resting against the bottom of the legs (636), and for the cartridge stem part (303) to pass through the stem port (233) in the hollow body section (637). Intermediate aligning conduits (632) are configured to receive bolts 625. Attaching means, which are plate holes (634), are configured in use to align with a cooperating attaching means, which are cooperating holes in a turn actuator embodiment (900).

Figure 6:
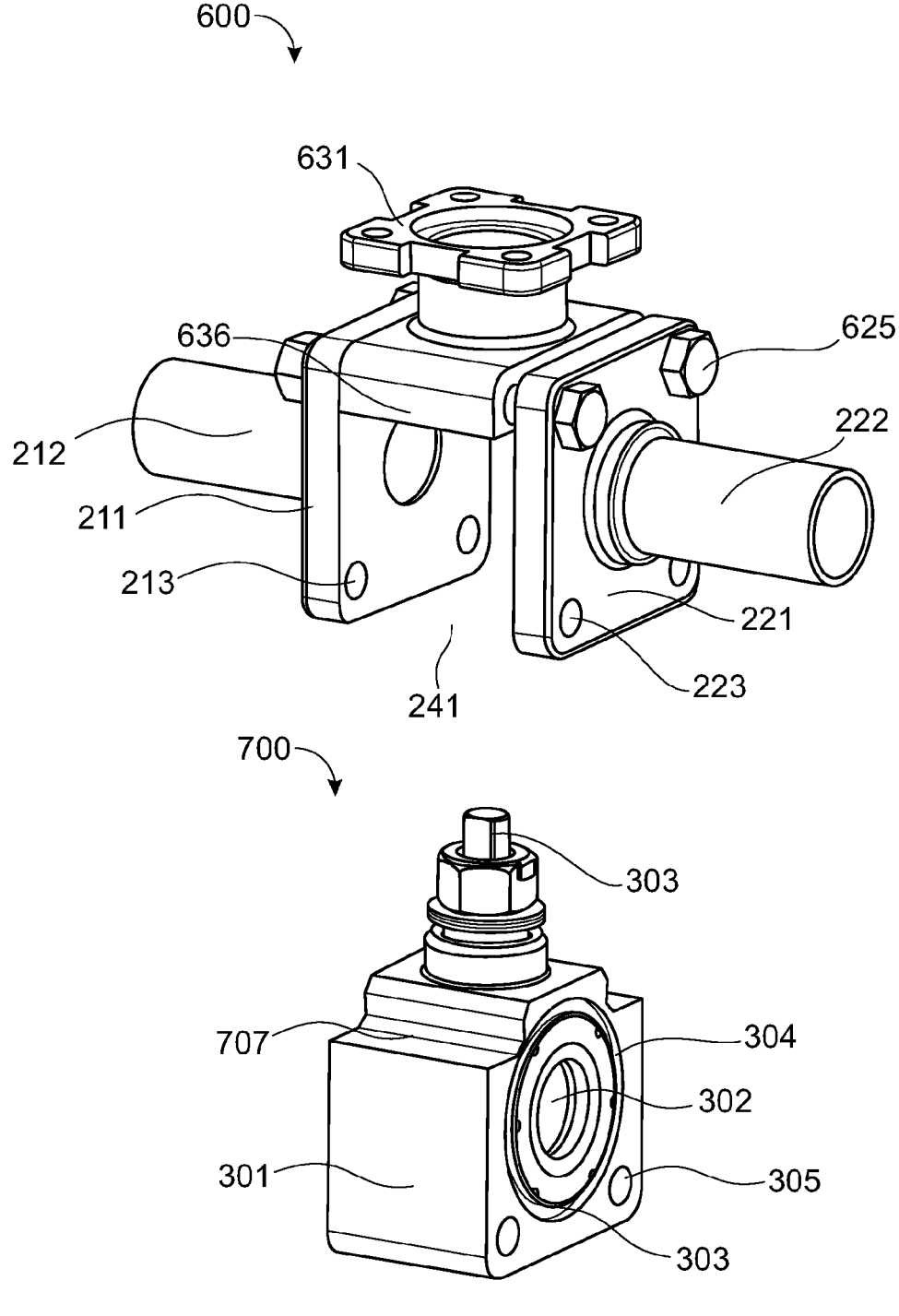
FIG. 6 shows a perspective view of a ball valve adaptor assembly embodiment with a ball valve cartridge embodiment.

FIG. 6 substantially corresponds to FIG. 2(*a*), but where the actuator connector embodiment (630) shown in FIG. 5 replaces the actuator connector embodiment (230) shown in FIG. 2(*a*). FIG. 6 shows a perspective view of a ball valve adaptor assembly embodiment (600) ready to receive a ball valve cartridge embodiment (700) in the cartridge cavity (241) formed between outlet connector (210; e.g. 211-214) inlet connector (220; e.g. 221 225) and actuator connector (630; e.g. 631-638).

The outlet connector (210), inlet connector (220) and actuator connector (630) each respectively comprise an outlet connector plate (211), an inlet connector plate (221) and an actuator connector plate (631). The legs (636) of the actuator connector (630) bridge the top edge of the outlet connector (211) and inlet connector (221) plates and are held in place by bolts 625 that pass through intermediate aligning conduits (632) in the legs and the aligning holes (213; 223) in the inlet/outlet plates. The legs (636) are arranged in use to sit on/against shoulder notches (707) of the valve cartridge embodiment (700).

Figure 7:
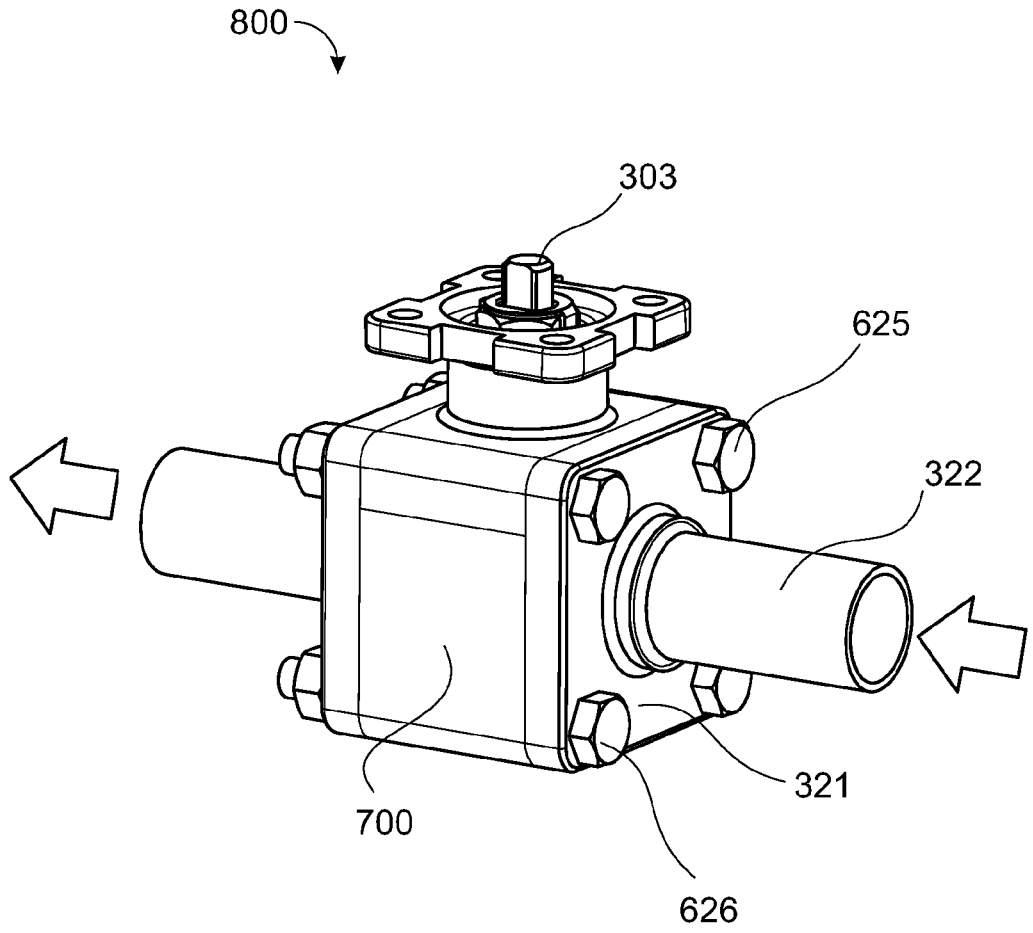
FIG. 7 corresponds to FIG. 6, but where the valve cartridge embodiment is located in the valve adaptor assembly embodiment.

FIG. 7 substantially corresponds to FIG. 2(*b*), but where the actuator connector embodiment (630) shown in FIG. 5 replaces the actuator connector embodiment (230) shown in FIG. 2(*a*). FIG. 7 shows the assembled parts in FIG. 6, where the ball valve cartridge embodiment (700) has been inserted into the space (241) between the plates and has been reversibly secured in place by lower bolts (626). The cartridge stem part (303) also passes through the actuator connector plate stem port (233). To release the ball valve cartridge embodiment (700) the lower bolts (626) are removed and the ball valve cartridge embodiment (700) is removed and replaced as necessary.

Figure 8:
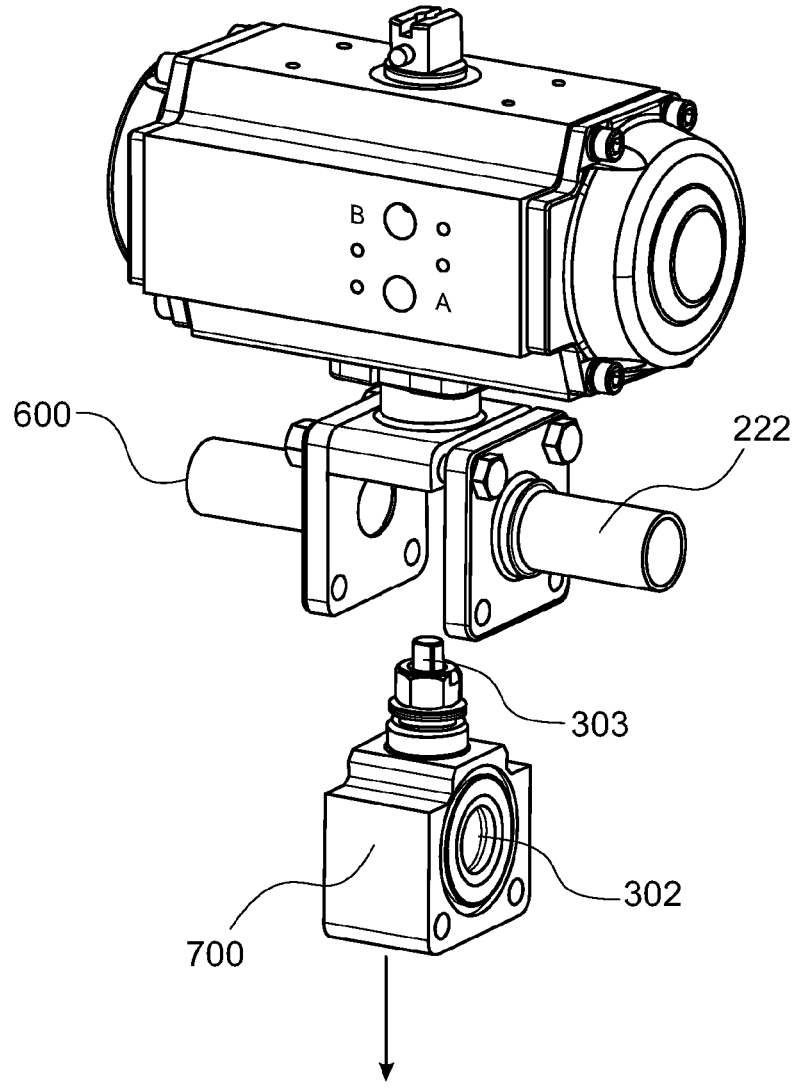
FIG. 8 shows a perspective view of a ball valve adaptor assembly embodiment, a valve actuator embodiment and a ball valve cartridge embodiment.

FIG. 8 substantially corresponds to FIG. 4, but where the actuator connector embodiment (630) shown in FIG. 5 replaces actuator connector embodiment (230) shown in FIG. 2(*a*).

Figure 9:
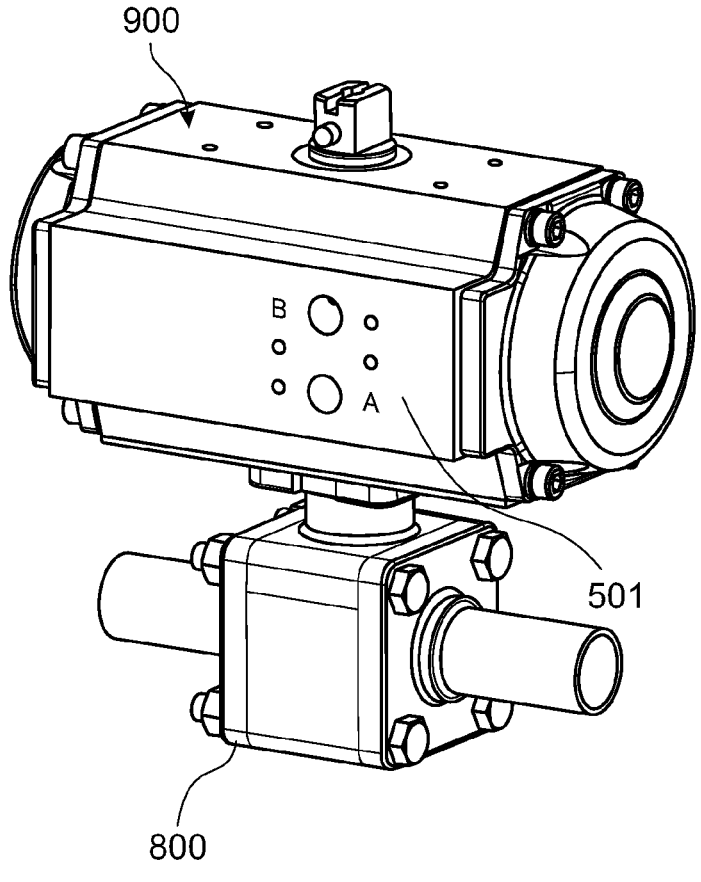
FIG. 9 corresponds to FIG. 8, but where this is in an assembled arrangement.

FIG. 9 substantially corresponds to FIG. 8 but in an assembled form, where the ball valve cartridge embodiment (700) has been inserted into the space between the plates (241) and reversibly secured in place by bolts (626). The cartridge stem part (303) also passes through the actuator connector plate stem port (233) and into the turn valve actuator (900). Reversibly removable joining means in the form of bolts (not shown) join the actuator connector plate (631) to the base of the turn valve actuator (900), passing through the plate holes in the connector plate (631) and into cooperating holes in the base of the turn valve actuator (900).

To release the ball valve cartridge embodiment (700) the lower bolts (626) are removed and the cartridge removed and replaced as necessary.

The invention claimed is:

1. A ball valve adaptor assembly for connection to a ball valve cartridge and for connection to a valve actuator, wherein the adaptor comprises:

an outlet connector, the outlet connector comprising an outlet connector plate and an outlet pipe, the outlet connector plate configured to connect to a housing outlet of the ball valve cartridge with the outlet pipe extending away from the housing outlet, and an inlet connector, the inlet connector comprising an inlet connector plate and an inlet pipe, the inlet connector plate configured to connect to a housing inlet of the ball valve cartridge with the inlet pipe extending away from the housing inlet, an actuator connector configured to reversibly connect to the outlet and inlet connector plates and configured to reversibly connect to the valve actuator, and wherein in use, when the outlet plate, inlet plate and actuator connector are connected, a cartridge cavity is formed between the outlet plate, inlet plate and the actuator connector, and wherein the cartridge cavity is configured to reversibly receive the ball valve cartridge; and wherein the outlet connector plate and the inlet connector plate each comprise aligning holes to receive reversibly removable bolts, which when connected align and secure the plates together; and wherein the actuator connector comprises intermediate aligning conduits that are configured in use to align with the aligning holes, and which are configured to also receive the reversibly removable bolts.

2. The ball valve adaptor assembly of claim 1 wherein the outlet connector plate and inlet connector plate are configured to be spaced apart and to face each other when the actuator connector connects to the outlet and inlet connector plates.

3. The ball valve adaptor assembly of claim 1 wherein the actuator connector comprises an actuator connector plate, the actuator connector plate comprises a projection to reversibly mate with a cooperating recess on the valve actuator, or the actuator connector plate comprises a plate hole or recess to reversibly mate with a cooperating projection on the valve actuator, or the actuator connector plate comprises a plate hole and the valve actuator comprises a cooperating hole or recess wherein the holes or recess are configured to reversibly mate with a cooperating projection.

4. The ball valve adaptor of claim 1 wherein the aligning holes comprise cooperating threads to cooperate with threads on the reversibly removable bolts.

5. The ball valve adaptor assembly of claim 1, wherein the actuator connector comprises an actuator base plate, the actuator base plate comprises legs, the legs comprising the intermediate aligning conduits.

6. The ball valve adaptor assembly of claim 3 wherein the actuator connector plate connects to the outlet and inlet connector plates via dovetail joints, the dovetail joints permit the outlet connector plate and inlet connector plate to move away from the actuator connector plate in a direction substantially in the plane of the actuator connector plate.

7. The ball valve adaptor assembly of claim 6 wherein the dovetail joints do not permit the outlet connector plate and the inlet connector plate to move in a direction orthogonal to the plane of the actuator connector plate.

8. The ball valve adaptor assembly of claim 1 further comprising the ball valve cartridge, the ball valve cartridge comprising:

a valve stem element comprising a reversibly rotatable stem part; and a valve housing comprising the housing inlet and the housing outlet in fluid communication via a fluid path therebetween, and wherein the fluid path comprises a ball chamber;

a rotary ball element comprising:

a ball inlet and a ball outlet in fluid communication via a fluid conduit therebetween, a stem recess configured to receive the stem part and rotational force from the stem part, wherein the ball chamber is configured to house the rotary ball element; and wherein the ball valve cartridge reversibly fits into the cartridge cavity; and wherein in use, when the stem part is rotated, providing rotational force to the stem recess to receive rotational force, the rotary ball element is rotated within the ball chamber, and wherein the valve is in an open position when the fluid conduit is in fluid communication with the housing inlet and the housing outlet, and the valve is in a closed position when the fluid conduit is not in fluid communication with the housing inlet and the housing outlet.

9. The ball valve adaptor assembly of claim 1 wherein the actuator connector comprises a stem port configured to allow the stem part of the ball valve cartridge to pass through the actuator connector.

10. The ball valve adaptor assembly of claim 9 wherein the stem port passes through an actuator base plate and an actuator connector plate, and wherein the actuator base plate and the actuator connector plate are connected via a hollow body section.

11. The ball valve adaptor assembly of claim 8 wherein the ball valve cartridge comprises intermediate aligning holes that are configured to align with the aligning holes.

12. The ball valve adaptor assembly of claim 11 wherein the intermediate aligning holes pass through the bottom and/or top portion of the ball valve cartridge.

13. The ball valve adaptor assembly of claim 11 wherein the intermediate aligning holes are configured to also receive the reversibly removable bolts.

14. The ball valve adaptor of claim 11 wherein the intermediate aligning holes comprise cooperating threads to cooperate with threads on the reversibly removable bolts.

15. The ball valve adaptor of claim 11 wherein the intermediate aligning holes do not comprise cooperating threads to cooperate with threads on the reversibly removable bolts.

16. The ball valve adaptor of claim 15 wherein the intermediate aligning holes are one or more of a bore, open channel, notch, or cut-away section in the ball valve cartridge.

17. The ball valve adaptor assembly of claim 11 wherein the valve housing comprises a stem port, the stem port configured to allow the stem part to pass through the valve housing.

18. The ball valve adaptor assembly of claim 17 wherein the stem recess is a slot.

19. The ball valve adaptor assembly of claim 3 wherein the projection is a Tee bolt.

20. The ball valve adaptor assembly of claim 3 wherein the projection comprises an asymmetric head portion which locks into the cooperating recess when the head is rotated after it has mated with the cooperating recess.

21. The ball valve adaptor assembly of claim 3 wherein the actuator connector plate comprises a plate hole and the valve actuator comprises a cooperating hole, wherein the plate hole and cooperating hole are configured to receive a bolt or a grub screw, the bolt or the grub screw in use reversibly secures the actuator connector and valve actuator together.

22. The ball valve adaptor assembly of claim 21 wherein the plate hole and cooperating hole comprise cooperating threads to cooperate with threads on the bolt or the grub screw.

23. The ball valve adaptor assembly of claim 1 which further comprises the valve actuator.

24. The ball valve adaptor assembly of claim 23 wherein the valve actuator is a turn actuator.

25. The ball valve adaptor assembly of claim 23 wherein the valve actuator comprises a stem recess to receive the stem element and wherein the actuator is configured to rotate the stem part when the actuator is rotated.

26. The ball valve adaptor of claim 23 wherein the valve actuator comprises a locking screw.

27. The ball valve adaptor assembly of claim 3 wherein the valve actuator comprises a cooperating projection arranged to cooperate with a plate hole in the actuator connector plate.

28. The ball valve adaptor assembly of claim 27 wherein the cooperating projection is threaded.

* * * * *